Dec. 2, 1969    R. B. WILLIS ET AL    3,481,118

CYCLONE SEPARATOR

Filed April 22, 1968    4 Sheets-Sheet 1

Inventors:
ROBIN BURKE WILLIS
DAVID LLOYD GEORGE BEATTIE
FERRIS GEORGE SWANN

By: Ernest Peter Johnson
AGENT

Dec. 2, 1969  R. B. WILLIS ET AL  3,481,118
CYCLONE SEPARATOR
Filed April 22, 1968  4 Sheets-Sheet 2
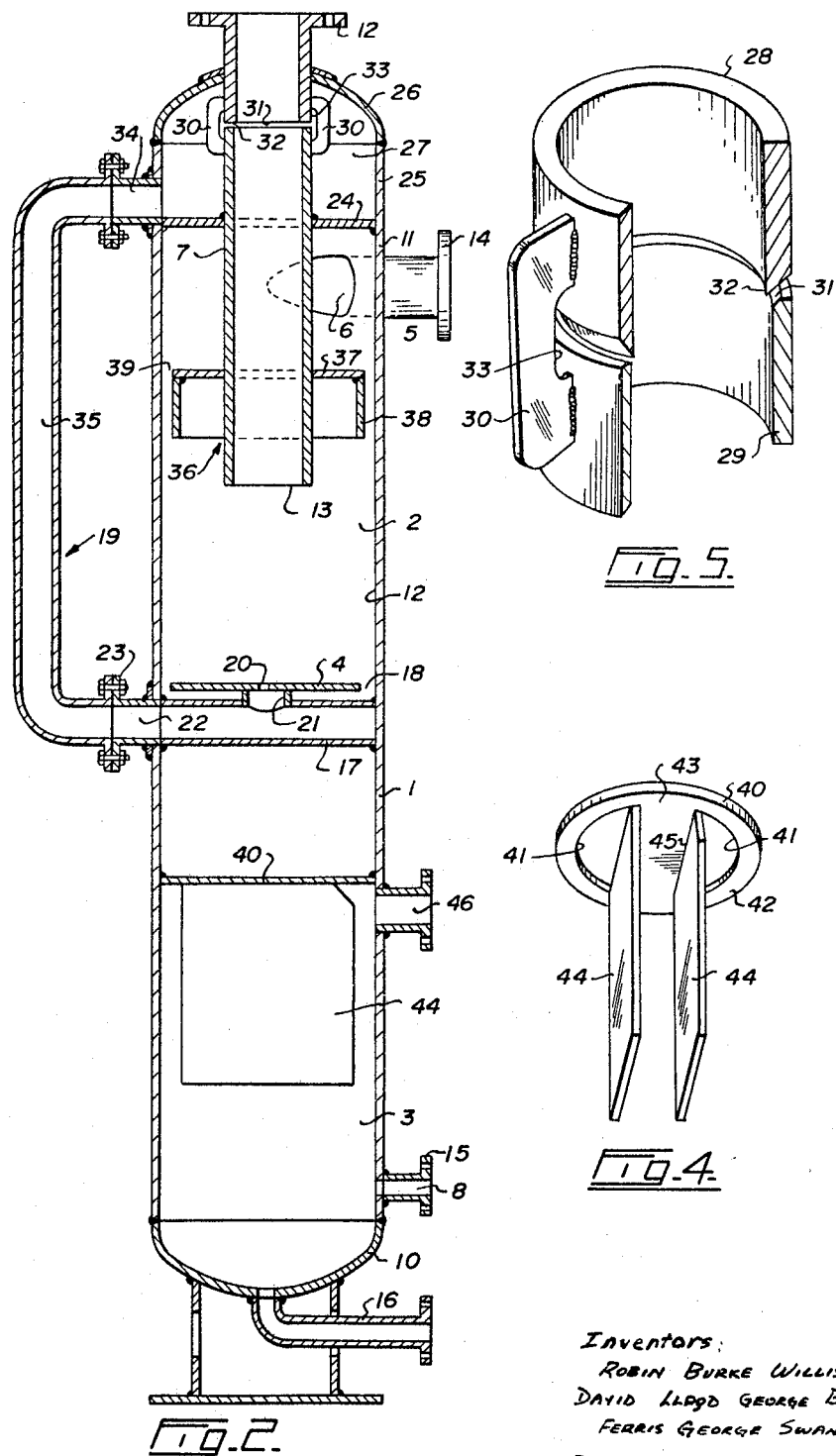
Inventors:
ROBIN BURKE WILLIS
DAVID LLOYD GEORGE BEATTIE
FERRIS GEORGE SWANN
By: Ernest Peter Johnson
AGENT

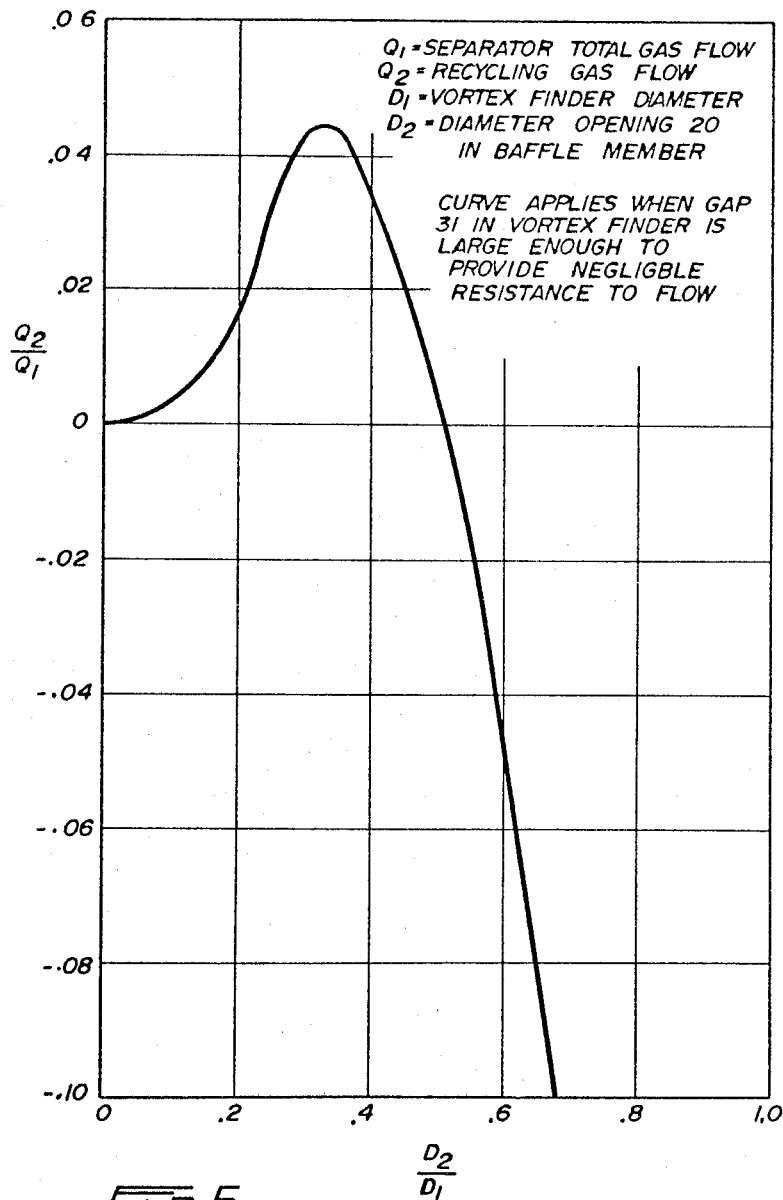

United States Patent Office 3,481,118
Patented Dec. 2, 1969

3,481,118
CYCLONE SEPARATOR
Robin Burke Willis, David Lloyd George Beattie, and Ferris George Swann, Edmonton, Alberta, Canada, assignors to Porta-Test Manufacturing Ltd., Edmonton, Alberta, Canada, a company of Alberta
Filed Apr. 22, 1968, Ser. No. 723,192
Int. Cl. B01d 53/24
U.S. Cl. 55—338                          6 Claims

ABSTRACT OF THE DISCLOSURE

A vertical, cylindrical, cyclone-type, hollow separator vessel, divided into an upper liquid-gas separation chamber and a lower liquid collection chamber by a horizontal baffle plate, is provided. Liquid may move from the upper chamber into the lower chamber through a gap defined between the outer edge of the baffle plate and the vessel wall. A vortex finder extends into the separation chamber for gas removal. The vortex finder is formed of two spaced, longitudinally aligned sections which define a gap between them. This gap is connected with a central opening in the baffle plate by a closed conduit. In operation, the low pressure zone located at the centre of the gas vortex causes suction to be exerted at the gap so as to recover liquid entrained in gas leaving through the vortex finder and return it to the separation chamber.

BACKGROUND OF THE INVENTION

This invention relates to centrifugal separators for the separation of liquid and gas.

Separators of the centrifugal, or cyclone, type have long been known. Such separators generally are formed with a cylindrical upper section and an inverted, truncated, conical lower section. The sections are co-axial and together form a hollow vessel. Closure of the top end of the vessel so formed is provided and the apex of the conical section is open to serve as an outlet. An inlet is provided into the cylindrical section. The feed to the inlet comprises a mixture of at least two components, the components having different specific gravities. For example, the feed may comprise a mixture of solid particles in gas. Means, associated with the inlet, are provided for establishing a flow of this mixture about the longitudinal axis of the vessel. Such means may comprise a conduit disposed tangentially to the inner surface of the vessel and connected to the inlet. Alternatively, such means may comprise a plurality of helical vanes arranged adjacent to the inlet. A vortex finder, longitudinally co-axial with the vessel, extends through the top closure into the cylindrical section.

In operation, the mixture of components is whirled around the longitudinal axis of the vessel on its inner surface. The heavier component, due to centrifugal force, moves outwardly and forms a layer against the vessel's inner surface. This layer spirals downwardly toward the apex outlet. The lighter component, usually gas, forms a central, downwardly whirling core or vortex which gradually reverses itself and is exhausted upwardly out the vortex finder.

Most prior art centrifugal separators are of conical configuration since a high order of separation efficiency is achieved with a conical vessel wherein the vortex whirls downwardly in ever decreasing cross-section and with ever increasing speed. Such conical vessels have long been used to separate small amounts of liquid from gas, as in the case of pipeline gas. However, they have found little application in cases where large volumes of liquid are to be separated from gas, as in the case of oil and gas separation. Instead, gravity type separators have long been the standard separation means in this field. Gravity type separators include a closed hollow vessel into which the mixture of oil and gas is fed at a point intermediate its ends. The vessel is made large enough to hold the mixture for a sufficiently long period of time to allow the liquid and gas to separate under the influence of gravity. Baffles are usually provided in the vessel to still the motion of the liquid and gas, thus minimizing remixing. The gas rises to the top of the vessel from whence it is exhausted. The oil collects in the bottom of the vessel and is withdrawn therefrom.

Due to their principle of operation, gravity separators are quite large in size for a particular throughput. A centrifugal separator, designed for the same throughput, would be considerably smaller in size. As a result, there would be a substantial saving in building materials if centrifugal separators were substituted for gravity separators in liquid-gas service. However, the ordinary cyclone separator, of conical shape, is reasonably efficient only when separating relatively small amounts of liquid from gas.

SUMMARY OF THE INVENTION

The present invention is directed to a centrifugal separator which is particularly suitable for the separation of large quantities of liquid from gas. The separator is preferably cylindrical in shape and may be fabricated by rolling. A highly efficient separator is provided which is low in cost in comparison to what is commonly available in the prior art.

In its simplest form the invention includes a vertical, hollow shell having top, bottom and side walls which define a chamber. The chamber is divided, by a baffle member or equivalent means disposed therein, into lower and upper portions, that is an upper separation chamber and a lower liquid collection chamber. The side wall defines an inlet, which is provided for feeding a mixture of liquid and gas under pressure into the upper end of the separation chamber. At least one outlet is provided for discharging liquid from the collection chamber. A conduit, commonly known as a vortex finder, extends downwardly through the top closure into the separation chamber for the exhaust of gas therefrom. The vortex finder is preferably co-axial with the longitudinal axis of the shell and extends to a point within the chamber below the inlet. Means, associated with the inlet are provided for establishing a flow of the liquid-gas mixture about the longitudinal axis of the shell for the centrifugal separation of the gas from the liquid to form an inner vortex or core of gas and an outer layer of liquid. Such means may comprise a conduit, tangential to the inner surface of the shell, connected to the inlet.

The baffle member is adapted to permit movement of the liquid layer from the separation chamber into the collection chamber while isolating the liquid collected in the collection chamber from the gas vortex to prevent it becoming entrained therein. In a preferred embodiment the baffle member comprises a flat, horizontal, co-axial plate fixed within the chamber intermediate the shell's top and bottom ends. The plate is disposed transversely to the shell's longitudinal axis. It is spaced from the inner surface of the shell. The liquid layer will move from the separation chamber into the collection chamber through the gap or communication path or conduit defined by the edge of the baffle plate and the inner surface of the shell.

The shell will normally be cylindrical in form. As stated hereinabove, a cylindrical shell is preferable from the viewpoint of fabricating cost. However, the inventive features may be applied with advantage to a shell which is other than cylindrical in form but circular in cross section.

In the development of the invention it has been found that the centrifugal separation of gas from liquid in a cylindrical vessel of practical dimensions is not complete.

In order to obtain substantially complete separation, it is necessary to provide a collection chamber in series with the separation chamber. In this collection chamber, the liquid and entrained gas which enter therein from the separation chamber are retained for a short period of time under quiescent conditions. During this period, the bulk of the entrained gas breaks out and finds its way back into the separation chamber from whence it exits in due course through the vortex finder.

Now, the baffle member carries out the necessary function of isolating the liquid in the collection chamber from the gas vortex. If this were not done, the gas vortex would re-entrain and remove some of the liquid through the vortex finder. Additionally, severe gas entrainment in the remaining liquid could occur. For optimum operation a baffle member having a cross-sectional area at least ½ that of the interior cross-sectional area of the shell is preferred to carry out the isolating function.

In a further embodiment, a recirculation assembly is provided to recover small quantities of liquid which are entrained in the gas being exhausted through the vortex finder or which are creeping up the interior vortex finder wall. In accordance with this feature, the votex finder is formed in two co-axial, spaced-apart sections to define a complete gap. The gap is formed at a point in the vortex finder outside the shell. A closed chamber is provided around the gap and the chamber is connected by a conduit to an opening provided in the centre of the baffle member. This baffle member opening is coincident with the shell's longitudinal axis. It opens into or communicates with the separation chamber. Advantage is thereby taken of the low pressure zone, which exists at the centre of the gas vortex, to provide suction at the gap. Upon application of suction at the gap, liquid within the vortex finder is drawn into the connecting conduit and is carried to the baffle plate opening. Upon being drawn into the gas vortex, it is immediately spun out to join the liquid layer. The ratio of the diameter of the baffle member opening to the interior diameter of the vortex finder should be between .1 and .5 for optimum operation.

In still a further feature of the invention, means are mounted on the vortex finder at a point below the inlet to substantially reduce losses due to liquid creep along the outer surface of the vortex finder. Drops of liquid which strike the vortex finder adhere to it and move along its outer surface until they reach its lower end. They are then drawn into the outgoing gas stream and are lost. These losses may be reduced substantially by mounting a skirted baffle, having an outwardly extending section and a downwardly extending section, on the vortex finder. The adhering liquid travels downwardly along the outer vortex finder surface, outwardly on the top surface of the outwardly extending section and then downwardly again on the outer surface of the downwardly extending section to its lower edge. The great bulk of this liquid drops off the lower edge and is spun, by centrifugal force, into the liquid layer.

The skirted baffle serves the additional function of centralizing the gas vortex to ensure that it is co-axial with the vortex finder and baffle member. As a result, maximum suction at the central opening in the baffle member is achieved. Additionally, the skirted baffle spreads out slugs of liquid on the inner surface of the shell to prevent them from catching on the baffle member.

DESCRIPTION OF THE DRAWINGS

In drawings which illustrate the embodiments of the invention:

FIGURE 2 is a cross-sectional view of another embodiment of the invention;

FIGURE 4 is an isometric view of the isolation plate assembly in accordance with the invention;

FIGURE 5 is an isometric view of a portion of the vortex finder gap assembly in detail;

FIGURE 6 is a graph showing the relationship of the ratio of flow through the baffle member opening over flow through the vortex finder to the ratio of the baffle member opening diameter to the vortex finder inner diameter;

DESCRIPTION OF THE PREFERRED EMBODIMENT

Figures 1, 3:
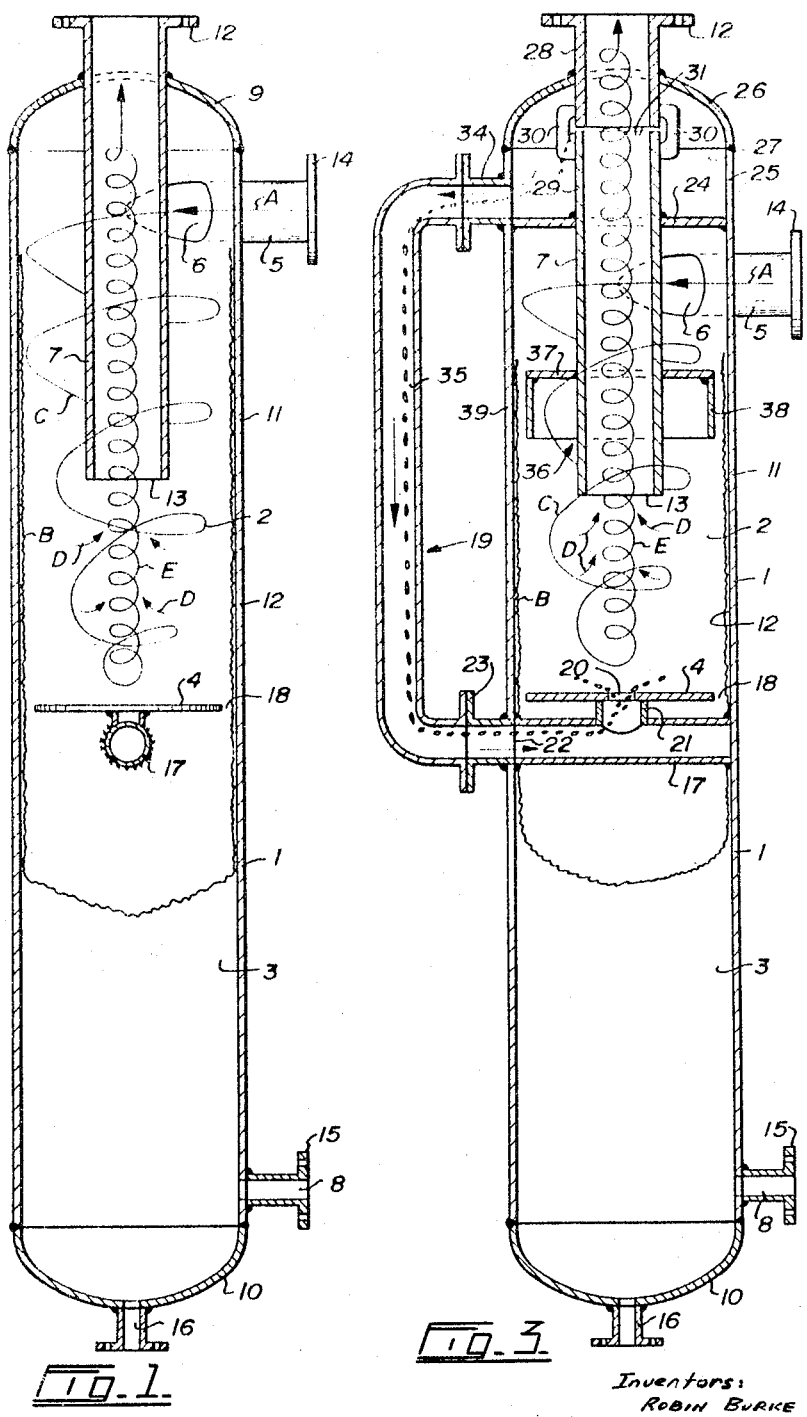
FIGURE 1 is a cross-sectional view, partly diagrammatic, of an embodiment of the invention.
FIGURE 3 is a cross-sectional view, partly diagrammatic, of a simplified version of the embodiment shown in FIGURE 2, showing the operation of the recirculation assembly.
Figure 7:
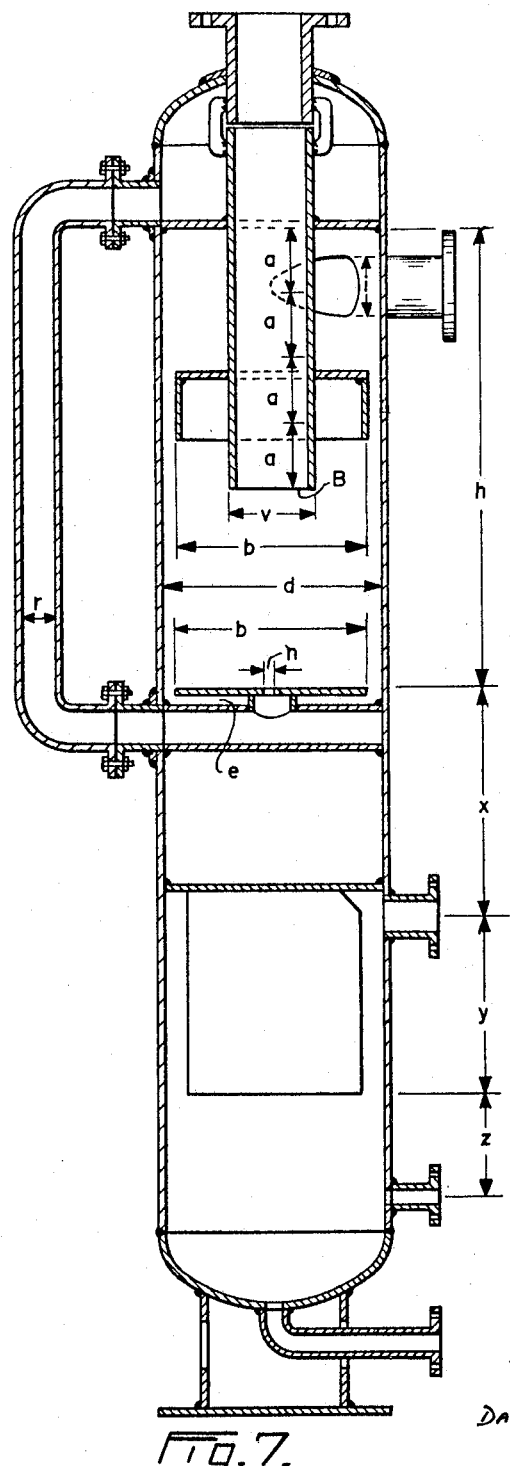
FIGURE 7 is identical to FIGURE 2 but is lettered to indicate particular dimensions.

Referring now to FIGURE 1, a centrifugal separator in accordance with this invention includes a shell 1 defining an upper separator chamber 2 and a lower liquid collection chamber 3. A baffle member 4 is disposed intermediate the chambers 2, 3. Conduit 5 is connected to inlet 6 leading into the upper portion of separation chamber 2. Vortex finder 7 extends through the top closure of shell 1 into separation chamber 2. An outlet 8 leading from collection chamber 3 is provided.

Shell 1 comprises a vertical, cylindrical vessel having top and bottom closure provided by caps 9, 10 fastened as by welding and the like to the ends of shell side wall 11. Shell 1 is elongated in configuration and the inner side wall surface 12 is smooth to provide unobstructed flow of liquid thereon. It is constructed of standard separator material, usually steel, selected to withstand the pressures and stresses of service.

Vortex finder 7 extends downwardly through top cap 9 into separation chamber 2. It is co-axial with the longitudinal axis of shell 1. A flange 12 is provided at its upper end for connection with a gas collection line (not shown). The vortex finder 7 is secured in place as by welding and the like to provide a pressure tight seal between its circumferential surface and top cap 9.

Horizontal conduit 5 intersects vertical side wall 11 tangentially and communicates through inlet 6 with separation chamber 2 at a point adjacent the chamber's upper end and above the inlet 13 of vortex finder 7. Conduit 5 and inlet 6 are thereby adapted to direct feed mixture tangentially onto the inner side wall surface 12 to establish a flow of the mixture about the longitudinal axis of shell 1. Conduit 5 is provided with a flange 14 for connection to a source (not shown) of feed mixture. It will be appreciated that other structures, such as helical vanes, can be used to serve this function. The tangential conduit is mounted exteriorly of the inlet 6 while the vanes 60 (see FIGURE 8) would be mounted interiorly adjacent the inlet 61. In both cases the structures are "associated with" the inlet.

An outlet 8 is defined by side wall 11. It is provided for the discharge of liquid from collection chamber 3. Outlet 8 is provided with a flange 15 for connection with conventional means (not shown) for regulating the rate of discharge. Flanged drain outlet 16 is provided, leading from the bottom of cap 10, for the removal of solids or heavy liquid components collected therein.

Baffle member 4 is shown as a solid, flat, horizontal disk. It is mounted on tubular support 17, which extends transversely across the interior of shell 1. Support 17 is secured at its ends to inner surface 12 as by welding and the like. Baffle member 4 is centrally disposed within shell 1 and is of lesser diameter than the shell interior. Gap 18 is thereby defined between the edge of baffle member 4 and inner surface 12.

It is self-evident that a large number of differently 4 to carry out its functions. For example, the baffle could be dished or conical or skirted. However, in order to allow uninterrupted flow of liquid past the baffle, the gap 18 should extend completely around the baffle.

A recirculation assembly 19 is incorporated in the preferred embodiment illustrated in FIGURE 2. Essentially, the assembly 19 involves providing an opening 20 in baffle member 4, a complete, circumferential gap 31 in vortex finder 7 at a point outside shell 1, and a sealed conduit connecting opening 20 and gap 31, providing a flow path therebetween.

In greater detail, baffle member 4 is formed to define opening 20, co-axial with the longitudinal axis of vortex finder 7. The member extends outwardly from the opening toward the inner surface of the shell side wall. Tubular support 17 is connected through tubular collar 21 to opening 20 and provides a conduit from opening 20 through aperture 22 in side wall 11. A flange 23 is welded to the end of tube 17 extending through side wall 11 at aperture 22. Top closure of shell 1 is provided by horizontal plate 24. Plate 24 is fastened around its circumference to inner surface 12 as by welding and the like to provide a pressure tight seal. Side wall 11 is extended upwardly to form extension 25. Top member 26 is fastened across extension 25 as by welding and the like to complete defining suction chamber 27. Vortex finder 7 extends downwardly through top member 26 and plate 24. It is fastened circumferentially at its intersections with top member 26 and plate 24 as by welding and the like to provide pressure tight seals. The vortex finder 7 is formed in two sections 28, 29 which are maintained by blocks 30 in co-axial, spaced-apart relation to define gap 31. The gap 31 is located within suction chamber 27; that is, at a point outside shell 1. For best performance of the assembly 19, upper vortex finer section 28 has a slightly smaller inner diameter than lower vortex finder section 29 whereby an overhang 32 is provided (see FIGURE 5). Overhang 32 helps to prevent droplets of liquid within vortex finder 7 being carried across gap 31. Blocks 30 are formed with an indented channel 33 adjacent gap 31 to form a saddle so that there is no blockage of the gap 31. Blocks 30 are secured to sections 28, 29 as by welding and the like. A flanged outlet 34 is provided from suction chamber 27. Flanged outlet 34 is connected, through pipe 35, to flange 23 of tube 17. A sealed conduit is thereby provided between vortex finder gap 31 and baffle plate opening 20.

A skirted baffle 36 is mounted on vortex finder 7 at a point spaced below feed inlet 6. It comprises a flat, outwardly extending member 37, secured to vortex finder 7, and a downwardly extending skirt 38, the outer edge of member 37 is spaced inwardly from the shell inner surface 12 whereby an annular pasage 39 is defined between skirt 38 and surface 12.

A horizontal splash ring 40 is disposed within collection chamber 3. Splash ring 40 comprises a plate, fastened around its circumferential edge to the inner surface of side walls as by welding and the like. Splash ring 40 is provided with openings 41 to leave a circular shoulder 42 and a central span 43. Communication is available between the portions of collection chamber 3 above and below ring 40 through openings 41 therein.

Parallel, rectangular isolation plates 44 are connected to and are suspended from the edges 45 of span 43. Plates 44 serve to define a quiescent zone between them within collection chamber 3.

A threaded or flanged float outlet 46 is provided in side wall 11 at a point adjacent to and below splash ring 40. A conventional liquid level float (not shown) may be threaded into outlet 46 to control the regulation of liquid discharge through outlet 8.

The mixture fed to the separator through inlet 6 includes a gas component and at least one liquid component. For example, the mixture may include gas, oil and water. In addition, the mixture will often include incidental amounts of solids, such as sand.

In operation, the mixture A is fed, under pressure, through conduit 5 and inlet 6 into separation chamber 2.

Due to tangential intersection of conduit 5 with side wall 11, mixture A will be induced to spin in a downward helical flow around the longitudinal axis of shell 1. An immediate separation of gas from liquid will commence.

Due to the centrifugal forces acting on it, the liquid phase will move outwardly and form a liquid layer B on inner side wall surface 12. Liquid layer B will rotate downwardly while remaining spread out upon surface 12. As illustrated in FIGURE 1, the downwardly spinning gas vortex C converges toward centre, turns upward at D, and forms an upwardly spinning vortex E which moves into the inlet 13 of vortex finder 7 and is exhausted from shell 1 via vortex finder 7. The spinning of the gas causes a lower pressure zone to exist at the axis than at surface 12, and it has been found necessary to provide means to prevent the liquids in collection chamber 3 from being sucked up into the low-pressure centre of the gas vortex and being partially exhausted with the gas. Baffle member 4 provides such a means by isolating the quiet region below it from the gas vortex above it.

Any liquid in separation chamber 2 which does not spin and is thus not subject to centrifugal forces tends to be drawn toward the low pressure centre of the gas vortex. This effect occurs on all surfaces that lead toward centre. Thus a thin film of liquid creeps from the inlet 6 of separation chamber 2 upward and across cap 9 to the outer surface of vortex finder 7 and thence downward and into inlet 13 of vortex finder 7 from whence it is undesirably lost or "carried over" with the gas.

Referring now to FIGURES 2 and 3, a recirculation assembly 19 is incorporated to prevent this undesirable loss of carry over liquid. A zone of low pressure exists along the longitudinal axis of gas vortex C. By centering the vortex C within chamber 2 to coincide with baffle member opening 20, suction may be exerted through the conduit system connecting it to vortex finder gap 31. In a manner comparable to that of a vacuum cleaner, the suction exerted at gap 31 draws any carry over liquid from the interior of vortex finder 7 and feeds it back into gas vortex C via outlet 34, conduits 35 and 17 and opening 20. The bulk of the recovered liquid is then flung by centrifugal action out to liquid layer B in the vicinity of baffle member 4.

Centering of gas vortex C within separation chamber 2 may be accomplished in several ways. For example, a symmetrical arrangement of opposed tangential feed inlets will accomplish this aim.

We have found that a single tangential inlet and feed conduit tends to cause the longitudinal axis of the gas vortex C to deviate from the longitudinal axis of shell 1. Skirted baffle 36 serves to maintain vortex C in an upright and centered position. Therefore, when combined with skirted baffle 36, a single tangential inlet and feed conduit may be used satisfactorily. Skirted baffle 36 also tends to reduce the amount of liquid that creeps to inlet 13 of vortex finder 7.

Liquid layer B, containing a small amount of entrained gas, passes through baffle gap 18 and is collected in collection chamber 3. Upon entering chamber 3, layer B is moving with a downward helical flow. To prevent it from agitating the collected liquid and entraining gas deeply therein, it is preferable to alter the direction of its flow. Splash ring 40 carries out this function. The downward flow is halted by transverse shoulder 42 and the liquid spills through openings 41 into the lower portion of chamber 3. As a result, the entrained gas is concentrated adjacent the upper surface of the collected body of liquid. The gas may easily break out and gradually work its way back into the separation chamber 2 where it will be caught up in gas vortex C and be exhausted.

The liquid which passes through splash ring openings 41 will still have a degree of turbulence. Isolation plates 44 serve to segregate the newly admitted liquid, creating a quiescent zone in the space between them. If a float mechanism is to be used to control the rate of discharge from chamber 3, the float may advantageously be located between the plates 44.

The liquid collected in chamber 3 may be discharged from collection chamber 3 on a periodic or continuous basis, depending on the nature of the control equipment used. If only a single component liquid is collected, it may be discharged through outlet 8. If a liquid with non-miscible components is collected, the components will separate by gravity into layers. Appropriate outlets may be provided in side wall 11 to draw the components off separately as desired.

We have found that certain dimensional relationships should exist between elements of the separator in order to obtain optimum performance.

The ratio of the diameter of baffle member opening 20 to the interior diameter of vortex finder 7 must be between .1 and .5 for successful operation of recirculation assembly 19. FIGURE 6 shows a plot of the ratio of gas flow through baffle member opening 20 over the gas flow through vortex finder 7 against the ratio of the diameter of baffle member opening 20 over the diameter of vortex finder inlet 13. It will be noted from the plotted curve that the operational range of recirculation assembly 19 is between .1 and .5 while the range of best operation is between about .2 and .4. The baffle member opening 20 and the conduit defined by vortex finder 7 have been described hereinabove as being circular. The aforementioned ratio is, therefore, expresed in terms of diameters. It will be appreciated that these openings can have other configurations, such as a polygonal configuration, although the circular configuration will be preferred. The word "diameter" as used with regard to the said ratio is therefore to be given a broad meaning so as to include the major dimension across the openings whether they are circular or only generally circular in configuration.

The ratio of the cross-sectional area of the vortex finder gap 31 to the cross-sectional area of the baffle member opening 20 preferably should be between 0.2 and 2.0. We have found that best performance of the recirculation assembly 19 occurs when the gap 31 and opening 20 are roughly equal in cross-sectional area.

The cross-sectional area of baffle member 4 preferably should be at least ½ the cross-sectional area of the interior of shell 1. If baffle member 4 is too small, excessive disturbance of the collected liquid will occur. If baffle member 4 is too large, of course, it will interfere with the flow of liquid layer B. Sufficient allowance must be made between inner surface 12 and the outer edge of baffle member 4 to permit layer B to pass therethrough.

Smoothing sleeve skirt 38 should preferably be at least twice as long as the width of annular passage 39. Observations indicate that the centering action of smoothing sleeve 36 is optimized when a long, narrow annular passage 39 is provided.

The size of the separator will be determined primarily by the allowable pressure drop across it at a given rate of throughput. The separator will have a characteristic resistance to flow, analogous to the characteristic of a meter orifice plate. We have developed formulas and dimensional relationships which may be used to design an efficient separator in accordance with this invention. These formulas and relationships are not to be considered as limitations on the invention since they may be departed from without seriously affecting the separator operation. They are provided as a guide useful in designing an efficient embodiment.

The formulas and relationships, using the symbols shown in FIGURE 2 to identify dimensions, are as follows:

(1) $$C = 345 Q \sqrt{\frac{GZT}{pdp}}$$

Where:
Q = flow rate, MMCF/day
C = separator coefficient
G = gas gravity
Z = gas compressibility factor
T = temperature ° Rankin
dp = pressure drop across separator, p.s.i.g.
p = static pressure at inlet, p.s.i.a.

(2) $\quad d = .33/C$ inches (3) $\quad h = 2.3d \quad\quad a = .32d$
$\quad\quad i = .27d \quad\quad b = .86d$
$\quad\quad v = .33d \quad\quad e = .03d$
$\quad\quad n = .25v \quad\quad x = d$
$\quad\quad r = .50v \quad\quad z = .50d$
$\quad\quad y = .80d$ This embodiment of the invention will now be illustrated by the following examples:

Example I

A centrifugal separator conforming to that illustrated in FIGURE 2 was constructed of steel. The separator was to be used in conjunction with an oil well located in Alberta. Maximum daily production from the well was known to be:

3.6 MMc.f./day of gas
80 bbl./day of oil
98 bbl./day of salt water

Other known factors were:

Allowable pressure drop across separator 5 p.s.i.
Gravity of the gas .7.
Compressibility factor of the gas .86.
Temperature of the mixture 580° R.
Inlet static pressure 1000 p.s.i.a.

Using the guide formulas given hereinabove, a separator having the following dimensions was built:

$d = 11.6$ inches $\quad\quad n = 1.00$ inch
$h = 26.5$ inches $\quad\quad r = 1.94$ inches
$x = 12$ inches $\quad\quad a = 3.50$ inches
$y = 10$ inches $\quad\quad b = 0.62$ inch
$z = 6$ inches $\quad\quad e = .37$ inch
$i = 2.90$ inches $\quad\quad v = 4.02$ inches The separator was installed at the oil well and hooked up in such a manner as to enable determination of the amount of liquid remaining in the gas from the separator.

Production from the well was fed to the separator, and it was determined that .06% of the total liquids entering the separator remained in the gas leaving the separator.

What is claimed is:
1. A centrifugal separator for separating liquid and gas comprising, in combination:
   a vertical shell of circular cross section having top, bottom and side walls which define a chamber;
   said side wall defining an inlet, opening into the chamber adjacent its upper end, through which a mixture of liquid and gas may be fed thereinto under pressure;
   one of said walls defining an outlet at the lower end of the shell for discharging liquid therefrom;
   means associated with the inlet adapted to establish a flow, of the mixture fed therethrough, about the longitudinal axis of the shell for the centrifugal separation of gas and liquid into an inner vortex of gas and an outer layer of liquid;
   a vortex finder extending into the chamber, to a point below the inlet, for the exhaust of gas therefrom, said vortex finder being co-axial with the shell and comprising two substantially co-axial conduit sections maintained in spaced-apart relation to define a gap;

a baffle member, fixed within the chamber intermediate the shell's top and bottom ends and disposed transversely to its longitudinal axis, said baffle member defining an opening, communicating with the upper portion of the chamber, whose centre is substantially coincident with the shell's longitudinal axis, and said baffle member extending outwardly from the opening toward the inner surface of the side wall and adapted to permit communication between the portions of the chamber above and below it while isolating the liquid collected in the lower portion from the gas vortex; and a sealed conduit connecting the vortex finder gap and the baffle member opening whereby the low pressure zone within the gas vortex can provide suction at the gap for the recovery of liquid moving through the vortex finder;

the ratio of the diameter of the baffle member opening to the interior diameter of the vortex finder being selected to ensure a flow of gas and liquid from the gap to the opening.

2. The separator defined in claim 1 wherein:
the ration of the diameter of the baffle member opening to the interior diameter of the vortex finder is between .1 and .5.

3. The separator defined in claim 2 wherein:
the gap is located at a point outside the shell; and
the shelf in cylindrical.

4. The separator defined in claim 2 wherein:
the ratio of the cross-sectional area of the vortex finder gap to the cross-sectional area of the baffle member opening is between 0.2 and 2.0.

5. The separator as defined in claim 4 wherein:
baffle means, having an outwardly extending section and a downwardly extending section, is mounted on the vortex finder at a point below the inelt, said baffle means being so constructed as to define an annular gap between the downwardly extending section and the inner surface of the shell.

6. A centrifugal separator for separating liquid from gas comprising, in combination:

a vertical, cylindrical shell having top, bottom and side walls which define a chamber;

said side wall defining an inlet, opening into the chamber adjacent its upper end, through which a mixture of liquid and gas may be fed thereinto under pressure;

said side wall extending upwardly from the top wall;

a top member extending across the extended side wall to cooperate therewith to define a closed suction chamber;

a conduit connected to the inlet, adapted to feed the mixture tangentially into the chamber to establish a flow, of the mixture fed therethrough, about the longitudinal axis of the shell for centrifugal separation of gas and liquid into an inner vortex of gas and an outer layer of liquid;

a vortex finder, extending downwardly through the suction chamber into the shell chamber, to a point below the inlet, for the exhaust of gas therefrom, said vortex finder being co-axial with the shell and comprising two substantially co-axial conduit sections maintained in spaced-apart relation to define a gap within the suction chamber;

a baffle member, fixed within the chamber intermediate the shell's top and bottom ends and disposed transversely to its longitudinal axis, said baffle member defining an opening, communicating with the upper portion of the chamber, whose centre is substantially co-incident with the shell's longitudinal axis, said baffle member extending outwardly from the opening toward the inner surface of the side wall to define an annular gap between the baffle member edge and the said inner surface through which liquid may move between the portions of the chamber above and below the baffle member, said baffle member adapted to isolate the liquid collected in the lower portion from the gas vortex;

a sealed conduit connecting the suction chamber and the baffle member opening whereby the low pressure zone within the gas vortex can provide suction at the gap for the recovery of liquid moving through the vortex finder;

the ratio of the diameter of the baffle member opening to the interior diameter of the vortex finder being between .2 and .4;

the ratio of the cross sectional area of the vortex finder gap to the cross-sectional area of the baffle member opening being between 0.2 and 2.0.

References Cited

UNITED STATES PATENTS

| | | | |
|---|---|---|---|
| 445,472 | 1/1891 | Manning | 55—447 |
| 458,550 | 8/1891 | Kutsche | 209—144 |
| 1,353,431 | 9/1920 | Sims | 55—459 |
| 2,106,589 | 1/1938 | Bigger et al. | 55—396 |
| 2,153,270 | 4/1939 | Osgood | 55—397 |
| 2,346,005 | 4/1944 | Bryson | 55—454 |
| 2,414,641 | 1/1947 | French | 55—459 |
| 2,562,007 | 7/1951 | Whittaker | 55—455 |
| 2,569,909 | 10/1951 | Umney | 55—396 |
| 2,918,139 | 12/1959 | Silverman | 55—499 |
| 2,936,043 | 5/1960 | Armstrong et al. | 55—449 |
| 3,151,961 | 10/1964 | Blackmore et al. | 55—459 |
| 3,200,568 | 8/1965 | McNeil | 55—459 |
| 3,212,234 | 10/1965 | McMinn | 55—177 |
| 3,288,300 | 11/1966 | Bouchillon | 55—459 |

FOREIGN PATENTS

| | | |
|---|---|---|
| 178,348 | 4/1954 | Austria. |
| 468,487 | 10/1950 | Canada. |
| 1,020,317 | 11/1952 | France. |
| 376,555 | 7/1932 | Great Britain. |
| 711,304 | 6/1954 | Great Britain. |

HARRY B. THORNTON, Primary Examiner

B. NOZICK, Assistant Examiner

U.S. Cl. X.R.

55—391, 394, 459; 209—211; 210—512